J. W. DARLEY, Jr.
MECHANICAL MOVEMENT.
APPLICATION FILED MAR. 30, 1911.
1,020,267.
Patented Mar. 12, 1912.
6 SHEETS—SHEET 1.
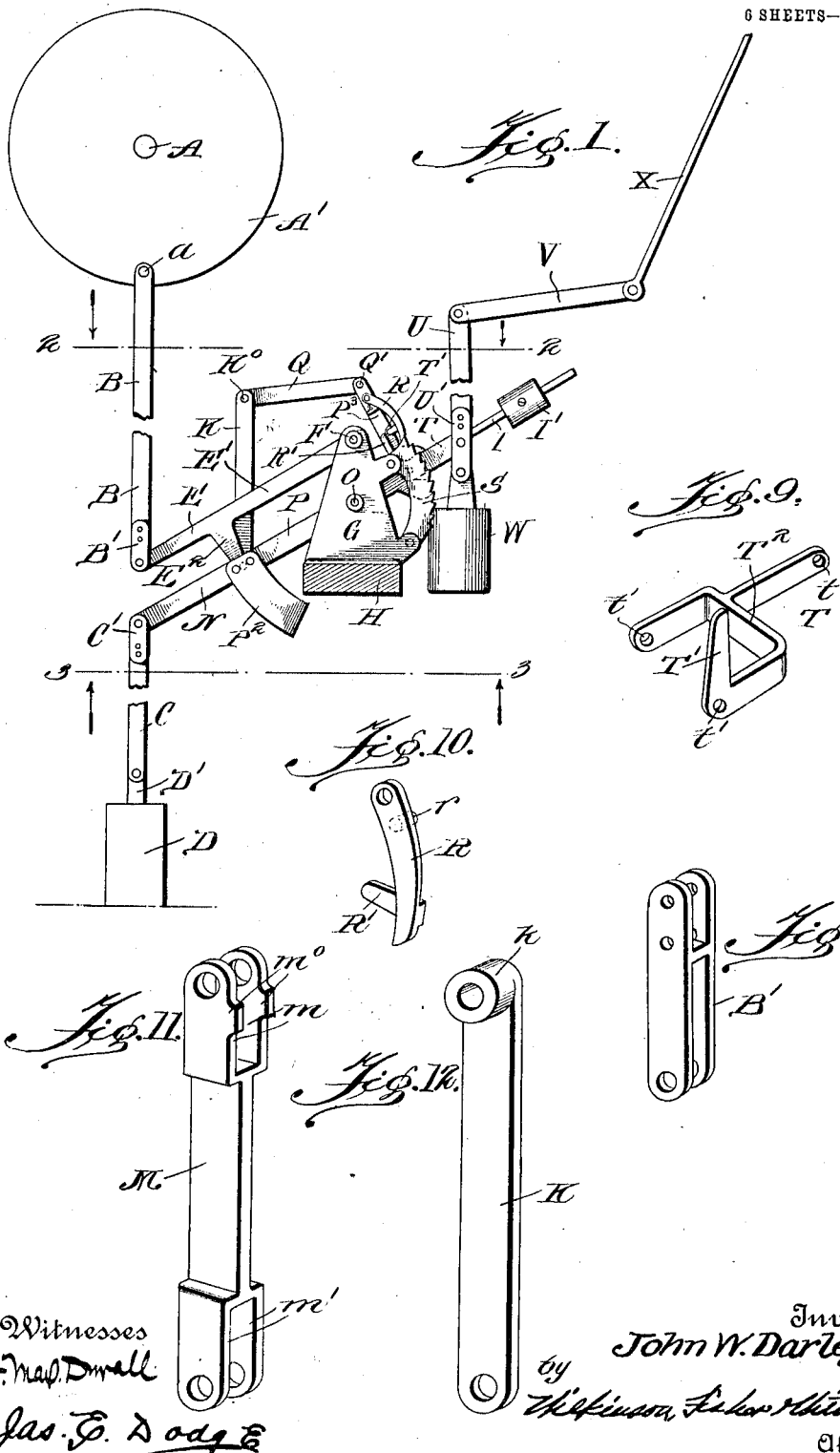

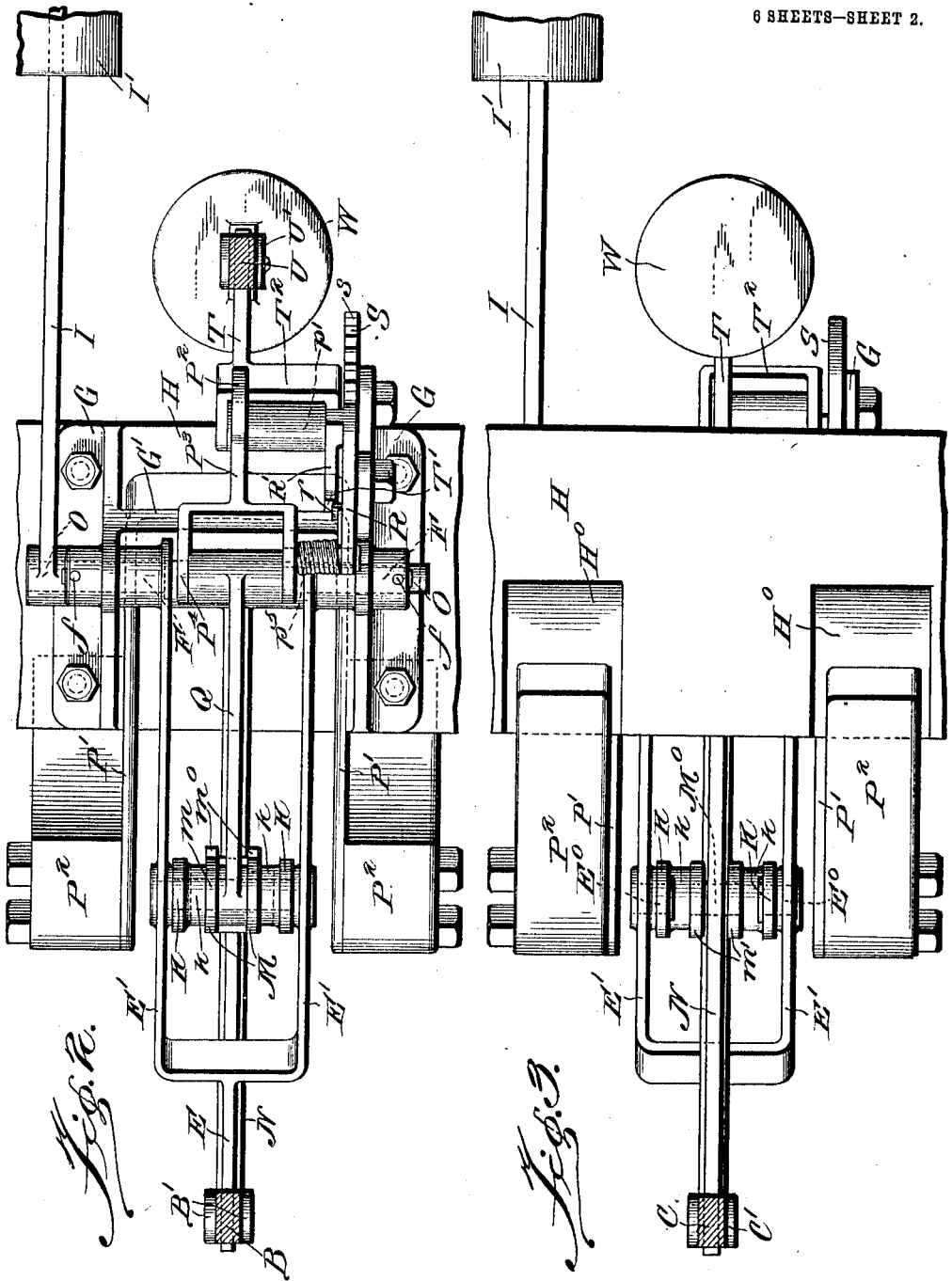

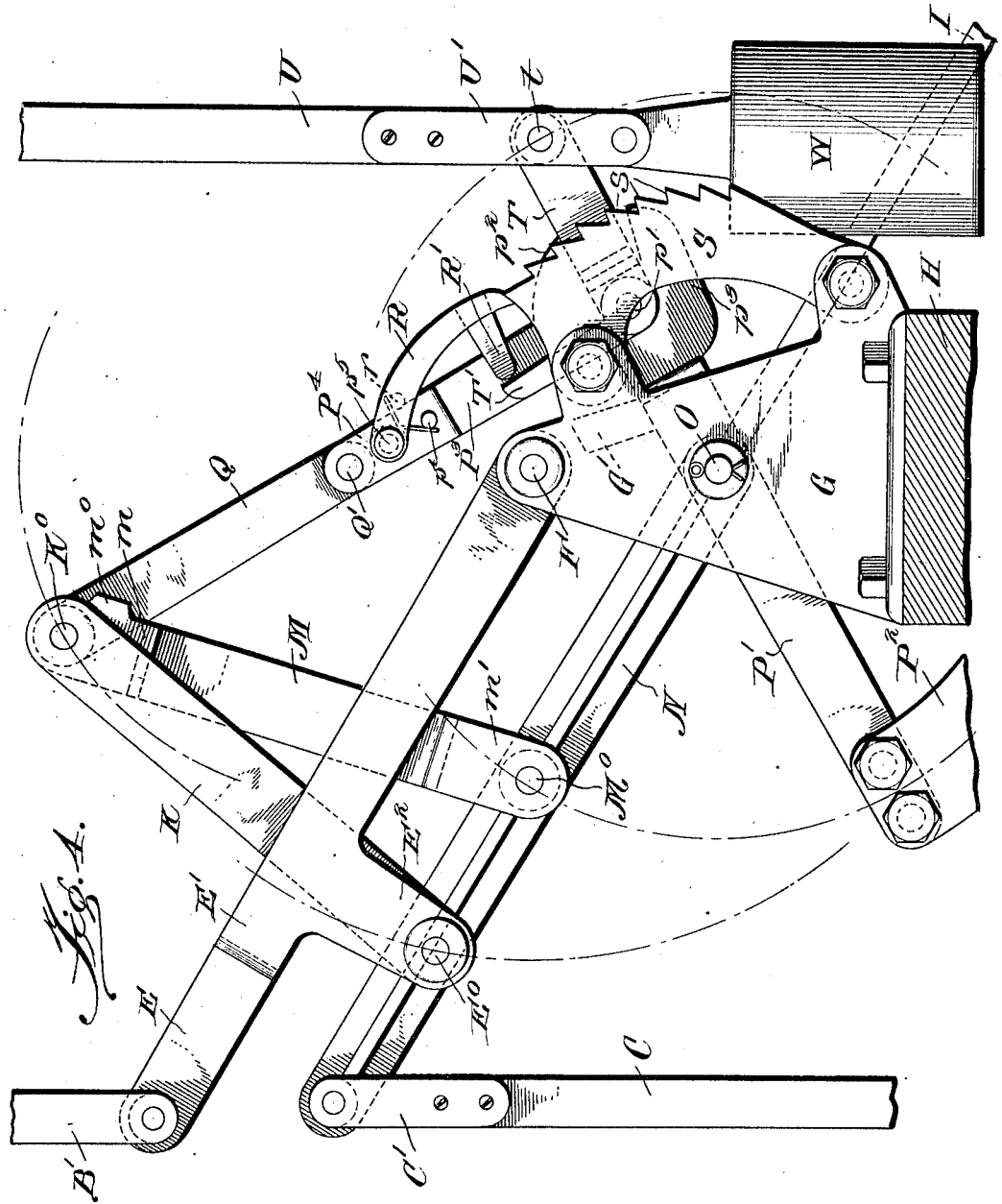

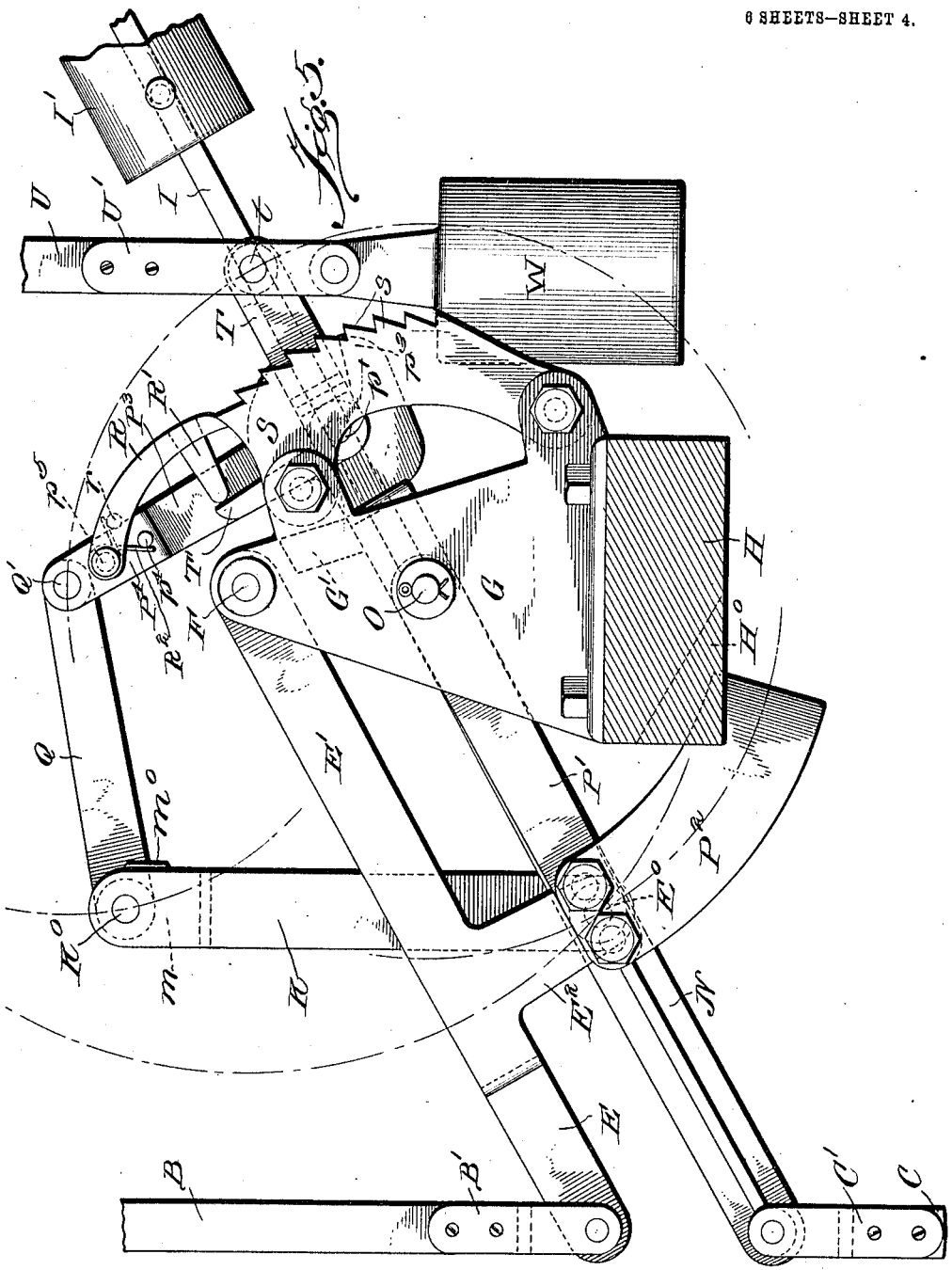

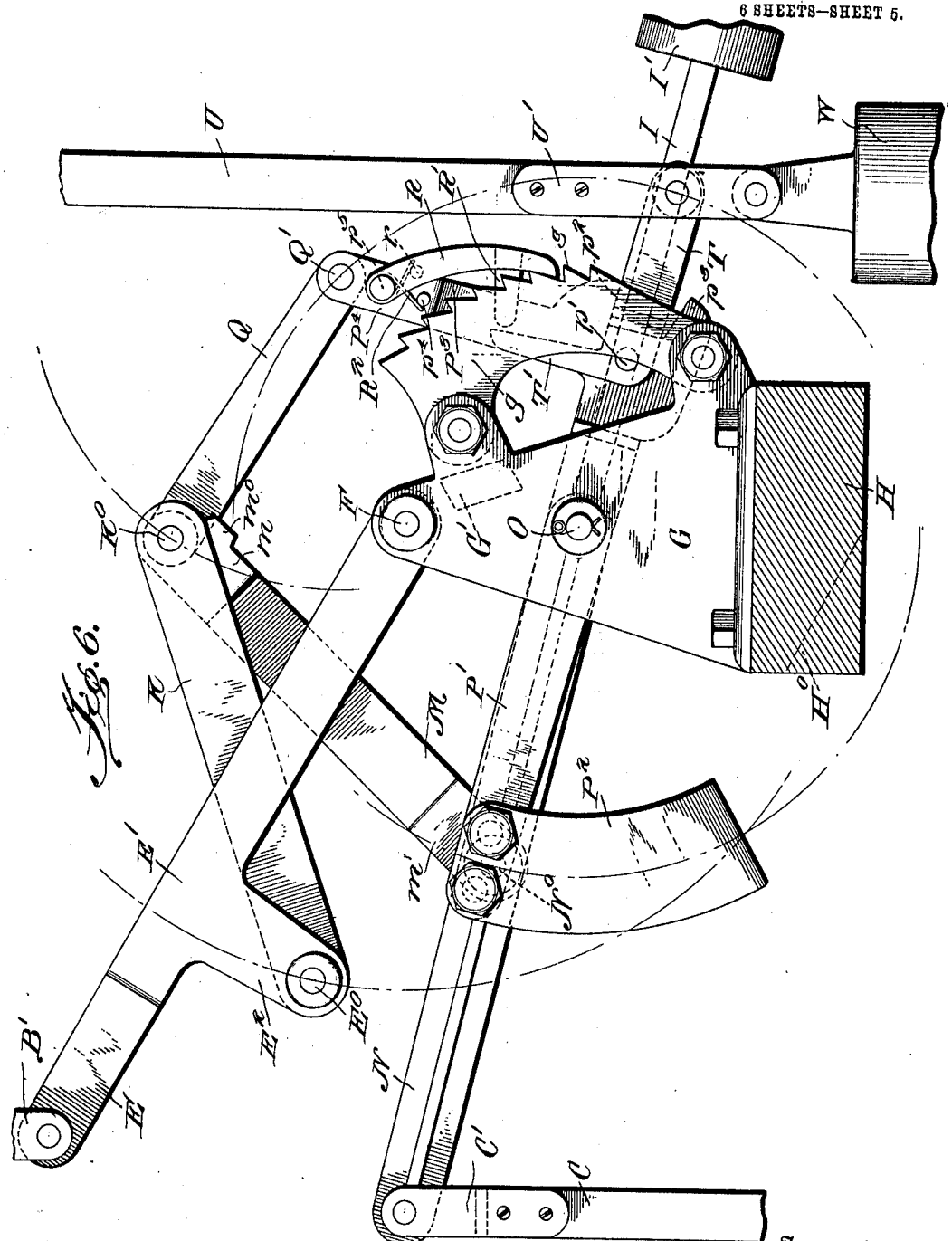

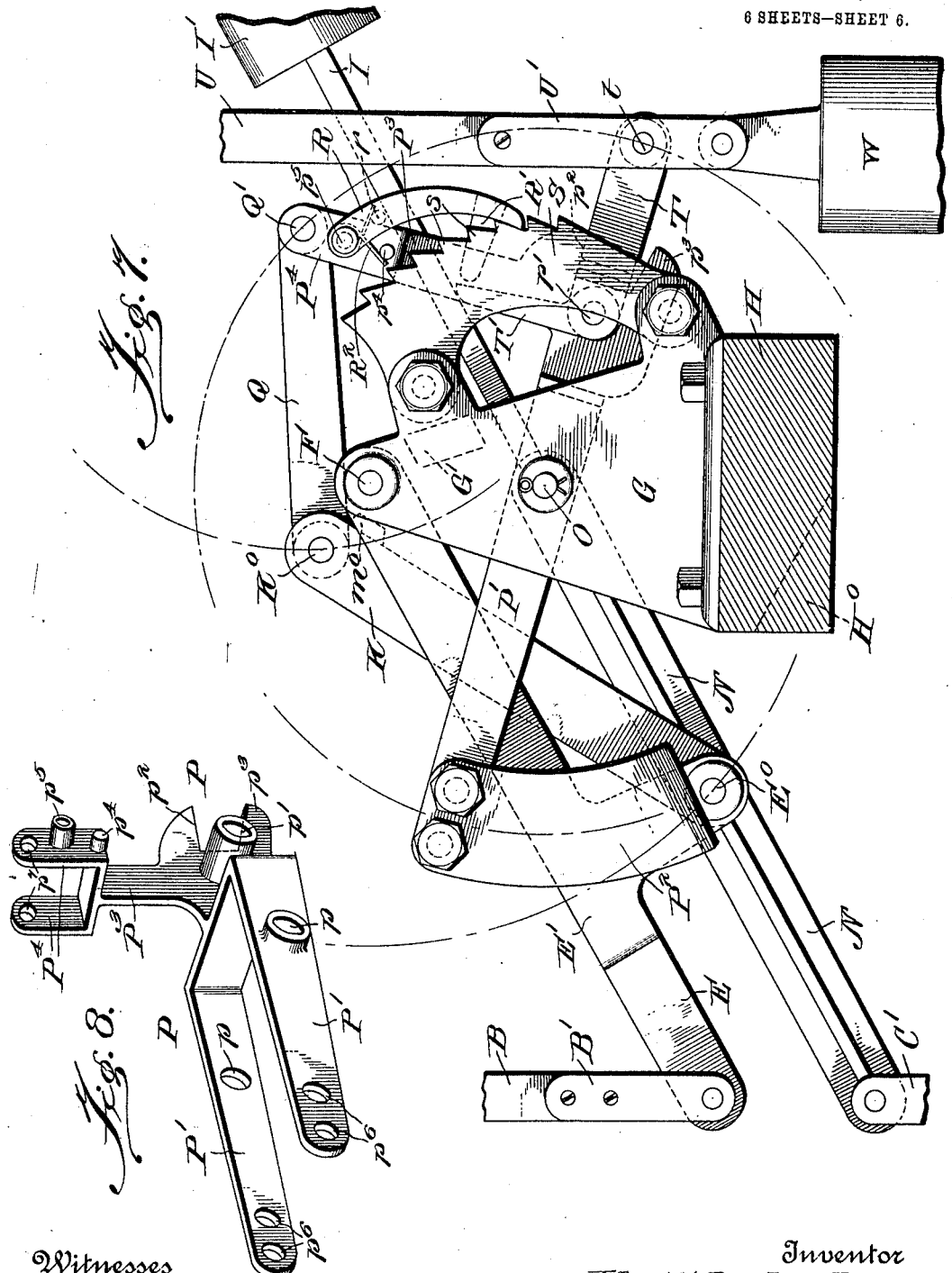

UNITED STATES PATENT OFFICE.

JOHN W. DARLEY, JR., OF BALTIMORE, MARYLAND, ASSIGNOR TO HAROLD A. HOLLISTER, OF SANTA BARBARA, CALIFORNIA.

MECHANICAL MOVEMENT.

1,020,267.  Specification of Letters Patent.  Patented Mar. 12, 1912.

Application filed March 30, 1911.  Serial No. 617,948.

*To all whom it may concern:*

Be it known that I, JOHN W. DARLEY, Jr., a citizen of the United States, residing at Baltimore, in the State of Maryland, have invented certain new and useful Improvements in Mechanical Movements; and I do hereby declare the following to be a full, clear, and exact description of the invention, such as will enable others skilled in the art to which it appertains to make and use the same.

My present invention relates to improvements in link motions for windmills or other motive power where the supply of power is liable to vary from time to time, and the purpose of my invention is to automatically control the application of the power so that it may be economically used under widely varying conditions.

My invention is especially intended to provide an automatic stroke-controlling device, whereby a windmill may be caused to operate a pump with a greater or less stroke, dependent upon the force of the wind.

My invention will be understood by reference to the accompanying drawings, in which the same parts are indicated by the same letters throughout the several views.

Figure 1 is a diagram showing the apparatus with the driving shaft and a pump connected thereto, parts being broken away. Fig. 2 shows a section along the line 2—2 of Fig. 1, and looking down. Fig. 3 shows a section along the line 3—3 of Fig. 1, and looking up. Fig. 4 is a view, on a larger scale, showing the link motion in the position for the maximum stroke, the parts being in the position assumed at the end of the up stroke. Fig. 5 is a similar view to Fig. 4, showing the parts in the position at the end of the down stroke. Fig. 6 is a similar view to Figs. 4 and 5, but shows the parts in the position for a shorter stroke, the stroke being neither the maximum nor the minimum, and the parts being in the position they would assume at the end of the up stroke. Fig. 7 is a similar view to Fig. 6, but shows the parts in the position at the end of the down stroke. Figs. 8, 9, 10, 11, 12, and 13 are details showing different members of the link mechanism.

A represents the drive shaft, which drives the crank disk A'. Obviously, a crank may be substituted for this disk, if desired. Pivoted to this crank disk A' is a connecting rod B, which is provided with the tail piece B', shown in detail in Fig. 13, which is connected by the link mechanism, hereinafter to be more fully described, to the similar tail piece C', connected to the rod C, driving a piston which works in the cylinder D' of the pump D (see Fig. 1). Interposed between the rods B and C and the tail pieces B' and C', is the link mechanism, which will now be described.

E represents a lever forked as at E' and provided with downwardly projecting arms $E^2$, which lever is pivoted on the two stub shafts F, and the arms $E^2$ are connected by the stub shafts E° to the links K, which are pivoted as at K° to the links M and Q. The link M is provided with forked ends $m$ and $m'$, pivoted, respectively, to the shaft K° and the shaft M°, and this link is also provided with lugs $m°$. The tail piece C' of the connecting rod C is connected to the lever N, which is pivoted to the link M by the pin M°, and this arm N is also pivoted to the shaft O, journaled in the frame G, mounted on the beam H. This frame G has a cross bar G'. The lever N is fast to the shaft O, and also fast to the same shaft is the arm I, carrying the adjustable weight I'. Loose on the shaft O is the member P, which has forked arms P', a web $P^3$, and other forked arms $P^4$, as seen in Fig. 8, together with journal bearings $p$, $p'$, and $p^5$, with the pin $p^4$ and jaws $p^2$ and $p^3$. The arms P' are perforated as at $p^6$ to permit the attachment of the counterweights $P^2$, which counterweights swing into the recesses H° in the beam H. Pivoted to the pin K° is the link Q, shown most clearly in Fig. 2, which is pivoted at its outer end to the pin Q', which passes through the holes $p^7$ in the jaws $P^4$, see Figs. 2 and 8.

R represents a pawl, shown most clearly in Fig. 10, which pawl carries a tripping arm R' and a pin $r$. The coil spring $R^2$ engages the pins $p^4$ and $r$, and tends to press the pawl R into engagement with the teeth $s$ of the curved rack S, which rack is fast to the frame G.

T represents a tripper, shown in detail in Fig. 9, which is pivoted as at $t$ with the tail piece U', secured to the connecting rod U, leading to the crank V, controlled by the wind vane X (see Fig. 1). Attached to the lower end of this connecting rod, is the control weight W. This tripper T projects between the jaws $p^2$ and $p^3$ of the member P, and is pivoted, as at $t'$ on the bearing $p'$ of the member P. The arm T' projects upward and is adapted to engage the arm R' of the pawl R, and to throw the pawl out of engagement when the weight W drops.

The operation of my improved device is as follows:—When the wind is blowing with a high velocity, the vane X is forced into the position shown in Fig. 1, thus raising the weight W, as shown, and bringing the members T and P to the position shown in said figure. The positions of these last named parts are better illustrated in Fig. 5, and it will be seen that the center of the shaft Q' is directly above the center of the shaft F. During the operation of the crank shaft A, the crank pin $a$ is carried around in a circle, and through the connecting rod B vibrates the lever E in a vertical plane. When the lever E is moved upwardly from the position shown in Fig. 5 to the position shown in Fig. 4, both of these positions being for the setting of the apparatus suitably for a heavy wind, the links K are moved upwardly by the stub shafts E°. The upper end of these links force the shaft K° upwardly, and this shaft is guided in the arc of a circle by the link, which has a bearing on its stub shaft Q'. As the shaft K° moves in the said arc of a circle, it pulls on the link M, and the lower end of said link, acting upon the stub shaft M°, vibrates the lever N in a vertical plane, and the lever N pulls upon the connecting rod C', and so reciprocates the piston of the pump D. The links Q, M, K, and their various points of attachment are so proportioned and located that the levers E and N shall have equal amplitudes of vibration. As long as the wind continues strong, the stub shaft Q' will be held in the position shown in Figs. 1, 4, and 5, and the operation of the crank shaft A will reciprocate the piston of the pump D to its maximum extent. If, now, the wind decreases in velocity, the pressure upon the vane X is reduced and is no longer able to support the weight W and connected parts in the position shown in Figs. 1, 4, and 5. The weight W consequently drops, moving the vane X toward the left (see Fig. 1) until the point is reached at which the pressure of the wind on said vane is able to support the weight W. As the weight W drops, it will be noted that the lever V moves downwardly, and the effective lever arm by which the weight W acts upon the vane X is the perpendicular distance between the line in which the weight W acts and the center of the shaft upon which the vane X and lever V revolve. As the lever V moves downwardly, this effective lever arm at which the weight W acts upon the vane X will decrease in length and will vary approximately as the sine of the angle the lever makes with a vertical line. Consequently, the effect of the weight W decreases as the lever V moves downwardly, and as the vane X moves toward the left a point is reached where a wind of moderate velocity can support the weight W in position. As the weight W moves downwardly upon a decrease in the velocity of the wind, the first effect is to move the shaft $t$ downwardly. This brings the end T' of the member T against the part R' of the pawl R. This removes the lower end of said pawl from contact with the rack teeth S, and further downward movement of the shaft $t$ brings the member T in contact with the lower jaw $p^3$ of the member P, and the further downward movement of the weight W revolves the member P upon the shaft O, thus moving the stub shaft Q' from the position shown in Figs. 1, 4, and 5 in the arc of a circle whose center is located on the axis of the shaft O, to the position shown in Figs. 6 and 7, which latter figures show the position the parts would assume when the wind has only a very moderate velocity. For higher velocities, the position of the stub shaft Q' would be intermediate between the position shown in Figs. 6 and 7 and the position shown in Figs. 1, 4, and 5, while for still smaller velocities of wind the position assumed would be farther around in a clockwise direction. The crank shaft A, of course, is continuing its revolution during the change of air and continues to vibrate the lever E in a vertical plane, and the action of said lever upon the link K is the same as before described, but the stub shaft K° being moved into a new position by the movement of the stub shaft Q' just described, said stub shaft K° moves in an arc of a circle located differently from that in which it moved before, and as the lever E moves upwardly, the stub shaft K° forces the link Q toward the left. This pushes upon the shaft Q' and tends to revolve the member P in a clockwise direction upon the shaft O, but this tendency to revolution is prevented by the pawl R, which comes into engagement with an appropriate tooth in the series of rack teeth S, and the stub shaft K° moves the upper end of the link M upwardly and rearwardly, and pulls upon the lever N as before, but by reason of the approach of the shaft K° toward the shaft F, the lever N is not vibrated to such an extent as it was in the previous instance, but it will be noted by reference to Figs. 5 and 7 that when the connecting rod B is in its lowest position, the position of the lever N is the same in both figures. It is evident that the position of the pump D, corresponding to the lowest position of the crank $a$, is the same in both cases. Hence, the stroke of said piston is only shortened on its upper side, the lowest point of said stroke remaining constant no matter how much the length of said stroke may vary. Should the wind increase in velocity, the connecting rod U will be pulled upwardly, thus pulling the right hand end of the member T upwardly and against the jaw $p^2$, in which position the arm P' is removed from the portion R' of the pawl R, and the continued upward movement of the link U moves the stub shaft Q' from the position shown in Figs. 6 and 7 toward that shown in Figs. 1, 4, and 5, the pawl being free to drop into the various teeth during this movement.

The counterweights $P^2$ are attached to the member P so as to provide that the said member and attached parts, excluding the connecting rod U, the connecting piece U', and weight W, can be approximately balanced upon the shaft O, so that resistance to the movements caused by the vane X and weight W is reduced to the smallest possible amount.

At times, it may be necessary to counterbalance the weight of the connecting rod C and attached parts, and for this purpose the lever I and adjustable weight I' are provided, so that said counterbalancing may be effected to any desired degree.

It will be noted that when the stub shaft Q' is moved downwardly and toward the right to such an extent that the center of the stub shaft K° is in alinement with the center of the shaft F, upon which the lever E vibrates, no motion of the shaft K° will result from the movement of the lever E, and hence the lever N, which derives all its movements from the motion of the shaft K°, will not be moved at all. To prevent the shaft K° moving below the position at which it is in alinement with the shaft F, the stops $m°$ are provided on the link M and limit the downward motion of said shaft K° when they come into contact with the cross piece G' of the frame G. Hence, it is evident that the lever E always vibrates to the same amplitude during the movement of the crank A, but that the lever N for the very smallest velocity of wind has no movement whatever, and as the velocity of the wind increases the vane X is moved toward the right, and by the movement hereinbefore described the amplitude of vibration of the lever N is increased up to an amplitude equal to the amplitude of vibration of the lever E. It should be noted in examining these movements that the locus of the center of the stub shafts E° is on a circle whose center corresponds with the axis of the shaft F; the locus of the center of the shaft M° is on a circle whose center is on the axis of the shaft O; the locus of the center of the shaft Q' is on a circle whose center is on the axis of the shaft O; and the locus of the center of the shaft K° is on a circle whose center is on the axis of the shaft Q'.

What is claimed is:—

1. In a mechanical movement, the combination of a reciprocating member, means for imparting uniform length strokes to said member, a second reciprocating member; means connecting said members comprising a pair of fulcrumed levers, links connecting said levers; and automatically controlled means for changing the position of said links for varying the throw of the second member, substantially as described.

2. In a mechanical movement, the combination of a reciprocating member, means for imparting uniform length strokes to said member, a second reciprocating member; a pair of fulcrumed levers having connection with said members, means for maintaining said levers in parallel relation whereby to obtain a uniform length stroke between said reciprocating members, and automatically controlled means for maintaining said levers out of parallel relation whereby to change the length of stroke of the second reciprocating member, substantially as described.

3. In a mechanical movement, the combination of a reciprocating member, means for imparting uniform length strokes to said member, a second reciprocating member, levers connected with said reciprocating members respectively, a support on which said levers are fulcrumed, a pair of connected links connecting said levers and automatically controlled means for adjusting the position of said links whereby to vary the length of stroke of said second reciprocating members, substantially as described.

4. In a mechanical movement, the combination of a reciprocating member, means for imparting uniform length strokes to said member, a second reciprocating member, levers connected with said members respectively, a support on which said levers are fulcrumed, a pair of links having pivoted connection and pivotally connected with said levers, a member fulcrumed on said support, a link connection between said fulcrumed member and said links, and means for changing the position of said fulcrumed member for adjusting the position of said links whereby to vary the length of stroke of said second reciprocating member, substantially as described.

5. In a mechanical movement, the combination of a reciprocating member, means for imparting uniform length strokes to said member, a second reciprocating member, levers connected with said reciprocating members respectively, a support on which said levers are fulcrumed, an arm fulcrumed on said support, a link connection between said arm and said connecting levers, means automatically operable to change the position of said arm, means for holding said arm in adjusted position, and means for automatically releasing said holding means, substantially as described.

6. In a mechanical movement, the combination of a reciprocating member, means for imparting uniform length strokes to said member, a second reciprocating member, levers connected with said reciprocating member respectively, a support on which said levers are fulcrumed, an arm fulcrumed on said support, a link connection between said arm and said connecting levers, a rod connected with said arm and automatically operable to change the position thereof, means for holding said arm in adjusted position, a releasing device for said holding means, and a weight carried by said rod adapted to actuate said releasing device and rod and change the position of said arms, substantially as described.

7. In a mechanical movement, the combination of a reciprocating member, means for imparting uniform length strokes to said member, a second reciprocating member, levers connected with said reciprocating members respectively, a support on which said levers are fulcrumed, an arm fulcrumed on said support, a link connection between said arm and said connecting levers, a rod connected with said arm and automatically operable to change the position thereof, a rack bar mounted on the support, a pawl carried by said arm adapted to engage with said rack bar and hold the arm in adjusted position, a releasing device for the pawl carried by the arm, and a weight carried by said rod, said weight adapted to actuate said releasing device and rod and change the position of said arm, substantially as described.

8. In a mechanical movement, the combination of a reciprocating member, means for imparting uniform length strokes to said member, a second reciprocating member, levers connected with said reciprocating members respectively, a support on which said levers are fulcrumed, an arm fulcrumed on said support, a link connection between said arm and said connecting levers, a rod connected with said arm and automatically operable to change the position thereof, a rack bar on the support, a pawl on said arm adapted to engage with said rack and hold said arm in adjusted position, a releasing device for said pawl, mounted on said arm; a weight connected with said releasing device and said rod, said weight adapted to actuate the pawl releasing device and move the rod in one direction, and a counterbalancing weight carried by said arm at the other end thereof, substantially as described In testimony whereof I affix my signature, in presence of two witnesses.

JOHN W. DARLEY, Jr.

Witnesses:
E. H. DARLEY,
L. A. DARLEY.

---

Copies of this patent may be obtained for five cents each, by addressing the "Commissioner of Patents, Washington, D. C."